United States Patent
Bikmukhametov et al.

(10) Patent No.: US 11,186,159 B2
(45) Date of Patent: Nov. 30, 2021

(54) METHOD FOR INTEGRATING A HIGH-VOLTAGE ACCUMULATOR INTO A SUPPORT STRUCTURE OF A MOTOR VEHICLE, AND MOTOR VEHICLE

(71) Applicant: Bayerische Motoren Werke Aktiengesellschaft, Munich (DE)

(72) Inventors: Ramil Bikmukhametov, Munich (DE); Andreas Burja, Unterschleissheim (DE); Richard Eiletz, Deisenhofen (DE); Martin Eis, Karlsfeld (DE); Thomas Herrmann, Illerkirchberg (DE); Herwig Kerstan, Maisach-Gernlinden (DE); Robert Loch, Munich (DE); Siegfried Massun, Wolnzach (DE); Marcus Raepple, Walpertskirchen (DE); Christoph Warkotsch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 37 days.

(21) Appl. No.: 16/837,237

(22) Filed: Apr. 1, 2020

(65) Prior Publication Data
US 2020/0223304 A1 Jul. 16, 2020

Related U.S. Application Data

(63) Continuation of application No. PCT/EP2018/075267, filed on Sep. 19, 2018.

(30) Foreign Application Priority Data

Nov. 9, 2017 (DE) ..................... 10 2017 219 895.8

(51) Int. Cl.
*B60K 1/04* (2019.01)
*H01M 50/20* (2021.01)

(52) U.S. Cl.
CPC ............... *B60K 1/04* (2013.01); *H01M 50/20* (2021.01); *B60K 2001/0438* (2013.01); *H01M 2220/20* (2013.01)

(58) Field of Classification Search
CPC ........................................................ B60K 1/04
See application file for complete search history.

(56) References Cited

U.S. PATENT DOCUMENTS 6,220,380 B1 * 4/2001 Mita .................... B60K 1/04
180/65.1
7,913,788 B1 3/2011 Bryer et al.
(Continued)

FOREIGN PATENT DOCUMENTS

DE 10 2009 040 598 A1 3/2011
DE 10 2011 009 987 A1 8/2011
(Continued)

OTHER PUBLICATIONS

International Search Report (PCT/ISA/210) issued in PCT Application No. PCT/EP2018/075267 dated Dec. 7, 2018 with English translation (five (5) pages).
(Continued)

*Primary Examiner* — James A Shriver, II
*Assistant Examiner* — James J Triggs
(74) *Attorney, Agent, or Firm* — Crowell & Moring LLP (57) ABSTRACT

A method for integrating a high-voltage accumulator having at least one accumulator module into a support structure of a motor vehicle, wherein the following is performed: providing a housing part, which has a base plate and a frame-like edge extending around the base plate; arranging the at least one accumulator module on the housing part and/or on the support structure; arranging the edge of the housing part below and on a frame structure formed of supports of the support structure; and fastening the housing part to the
(Continued)

support structure. An accumulator housing for the at least one accumulator module is thus formed. A housing interior of the accumulator housing is delimited by a bottom part of the support structure, which bottom part covers the frame structure toward a passenger compartment of the motor vehicle, and by the housing part and the frame structure.

13 Claims, 8 Drawing Sheets

(56) References Cited

U.S. PATENT DOCUMENTS

| | | | |
|---|---|---|---|
| 8,210,301 B2 | 7/2012 | Hashimoto et al. | |
| 2013/0115510 A1* | 5/2013 | Tani | H01M 4/1395 429/199 |
| 2014/0127539 A1 | 5/2014 | Helber | |
| 2015/0037629 A1* | 2/2015 | Janarthanam | H01M 10/6563 429/71 |
| 2015/0107921 A1 | 4/2015 | Naruke | |
| 2016/0023689 A1 | 1/2016 | Berger et al. | |

FOREIGN PATENT DOCUMENTS

| | | |
|---|---|---|
| DE | 10 2014 110 307 A1 | 1/2016 |
| DE | 10 2015 205 413 A1 | 9/2016 |
| EP | 2 704 915 B1 | 2/2015 |
| EP | 3 088 224 A1 | 11/2016 |
| JP | 2014-31168 A | 2/2014 |
| WO | WO 2016/012663 A1 | 1/2016 |

OTHER PUBLICATIONS

German-language Written Opinion (PCT/ISA/237) issued in PCT Application No. PCT/EP2018/075267 dated Dec. 7, 2018 (five (5) pages).

German-language Search Report issued in German Application No. 10 2017 219 895.8 dated Sep. 26, 2018 with partial English translation (13 pages).

* cited by examiner

METHOD FOR INTEGRATING A HIGH-VOLTAGE ACCUMULATOR INTO A SUPPORT STRUCTURE OF A MOTOR VEHICLE, AND MOTOR VEHICLE

CROSS REFERENCE TO RELATED APPLICATIONS

This application is a continuation of PCT International Application No. PCT/EP2018/075267, filed Sep. 19, 2018, which claims priority under 35 U.S.C. § 119 from German Patent Application No. 10 2017 219 895.8, filed Nov. 9, 2017, the entire disclosures of which are herein expressly incorporated by reference.

BACKGROUND AND SUMMARY OF THE INVENTION

The invention relates to a method for integrating a high-voltage accumulator having at least one accumulator module into a support structure of a motor vehicle. The invention also relates to a motor vehicle.

The interest is focused here on electrically drivable motor vehicles, for example electric vehicles or hybrid vehicles. The motor vehicles conventionally have an electric engine or an electric motor in the drive train for driving the motor vehicle, and a high-voltage accumulator or a traction battery for providing electrical energy for the electric engine. Such high-voltage accumulators generally comprise a multiplicity of interconnected accumulator modules which are conventionally arranged in a separate, closed accumulator housing. The accumulator housing is generally arranged on the motor vehicle at a certain minimum distance, e.g. 10 mm, from a body of the motor vehicle for tolerance reasons. The in any case negative effects of the high-voltage accumulator on a z dimension, i.e. on a construction space to be provided in the motor vehicle in the vertical direction of the vehicle for the high-voltage accumulator, are therefore additionally reinforced by the accumulator housing.

DE 10 2015 205 413 A1 describes a supporting structure for a vehicle, in which a frame structure formed from supports accommodates trough elements in which energy modules are arranged. The trough elements are covered here by a cover element. The accumulator housing formed from the trough elements and the cover element is integrated here in the frame structure.

In addition, the accumulator housing and a supporting of the accumulator housing on the body lead to an increase in weight of the motor vehicle. The weight is additionally increased if the accumulator housing, as described in DE 10 2009 040 598 A1, has elements which absorb impact energy, are deformed in the event of an accident of the motor vehicle and therefore at least reduce damage to the energy accumulator. To this end, EP 2 704 915 B1 proposes replacing parts of a support structure of the motor vehicle by the accumulator housing. However, this configuration of the high-voltage energy accumulator as a supporting structure with functions absorbing impact energy ("crash functions") requires a high outlay on design both for the high-voltage energy accumulator and for the support structure.

It is the object of the present invention to provide a solution as to how a high-voltage accumulator can be integrated into a support structure of a motor vehicle particularly simply and saving on weight, space and material.

This and other objects are achieved according to the invention by a method and a motor vehicle according to the claimed invention.

In a method according to the invention for integrating a high-voltage accumulator having at least one accumulator module into a support structure of a motor vehicle, a housing part having a baseplate and a frame-shaped edge surrounding the baseplate is provided. The at least one accumulator module is arranged on the housing part and/or on the support structure, and the edge of the housing part is arranged below and on a frame structure formed from supports of the support structure. Furthermore, the housing part is fastened to the support structure, with an accumulator housing for the at least one accumulator module being formed, wherein a housing interior of the accumulator housing is bounded by a floor part of the support structure, the floor part covering the frame structure in the direction of a passenger compartment of the motor vehicle, and by the housing part and the frame structure.

The support structure of the motor vehicle is designed in particular as a body substructure or body floor of a body of the motor vehicle. The body of the motor vehicle is designed in particular as a self-supporting body. The support structure comprises the supports which form the frame structure and which are designed for stabilizing the body and/or for absorbing collision forces in the event of a collision of the motor vehicle. The supports forming the frame structure are in particular two longitudinal members or sills extending in the longitudinal direction of the vehicle, a front crossmember extending in the transverse direction of the vehicle and a rear crossmember extending in the transverse direction of the vehicle. The frame structure is covered here by the floor part or floor plate. The floor part is therefore arranged above the frame structure in the vertical direction of the vehicle. The floor part rests in particular on the frame structure. The floor part has a lower side facing an ambient region of the motor vehicle, in particular a carriageway for the motor vehicle, and an upper side lying opposite the lower side in the vertical direction of the vehicle and facing the passenger compartment of the motor vehicle.

The high-voltage accumulator has at least one accumulator module or battery module, in particular a multiplicity of interconnected accumulator modules. An accumulator module has at least one accumulator cell or battery cell. The at least one accumulator module is arranged in an accumulator housing, wherein the accumulator housing is formed or arises by arrangement of the housing part on the support structure. Before the formation or during the formation of the accumulator housing, the at least one accumulator module can be fastened to the support structure and/or to the housing part. However, it can also be provided that the accumulator module is held in the housing interior by being clamped between the support structure and the housing part. In order to form the accumulator housing, the housing part is mounted on the support structure in particular from below, for example by the housing part being lifted in the vertical direction (of the vehicle) onto the support structure and being fastened there. The housing part is therefore in particular arranged suspended on the support structure. The housing part can be designed, for example, as a flat plate, wherein the edge and the baseplate are situated in one plane. It can also be provided that the edge is formed by a wall which is raised in relation to the baseplate. The edge is arranged from below on the supports, for example on end sides of the supports looking in the direction of the carriageway, and can completely cover the end sides. The housing part can be designed, for example, as an underbody cladding of the motor vehicle.

The floor part is formed in particular adjacent to the frame structure, but not to the edge of the baseplate. The accumulator housing therefore has the housing interior which is bounded or surrounded by the lower side of the floor part, the frame structure and the housing part. Owing to the fact that the housing part is arranged on the support structure from below, the accumulator housing can be opened again in a simple manner by removal of the housing part. The frame structure is a part or a component of the accumulator housing of the high-voltage accumulator. The support structure in an advantageous manner therefore replaces separate accumulator housing elements, such as, for example, a separate housing cover, and therefore contributes to the reduction in weight when the high-voltage accumulator is integrated into the motor vehicle. Since the supports which are used as parts of the accumulator housing can serve both for reinforcing the body and for absorbing collision forces in the event of an accident of the motor vehicle, the accumulator housing is formed in a particularly stable manner and with high operating strength. Additional and weight-increasing elements for absorbing collision forces on the accumulator housing can therefore be dispensed with in an advantageous manner and, as a result, the weight of the motor vehicle can be additionally reduced.

Preferably, the edge of the housing part is formed by a wall which is raised in relation to the baseplate, wherein a housing cover of the accumulator housing is formed by the floor part, a housing base of the accumulator housing is formed by the baseplate and a housing wall of the accumulator housing is formed by the wall and by the frame structure which is situated above the wall in the vertical direction of the vehicle. The baseplate has a lower side facing the ambient region of the motor vehicle and an upper side facing the support structure. The baseplate can be, for example, of rectangular design. The wall which is raised in relation to the upper side of the baseplate has in particular a constant height and in particular completely encircles the baseplate. The housing part is therefore designed to be substantially trough-shaped and open on one side. The housing part is preferably formed integrally, with the wall being able to be formed, for example, as a bent-up outer region of the baseplate. The housing part can be formed, for example, from sheet metal. Such a housing part can be manufactured or produced particularly simply and cost-effectively in high piece numbers.

The housing wall is formed here by the wall and the frame structure which is located thereabove in the vertical direction of the vehicle. For this purpose, regions of the wall which are oriented in particular along the longitudinal direction of the vehicle are arranged on the longitudinal members of the support structure and regions of the wall that are oriented along the transverse direction of the vehicle are arranged on the front and rear crossmembers of the support structure. A length of the regions of the wall that are oriented along the longitudinal direction of the vehicle corresponds in particular to a length of the longitudinal members. A length of the regions of the wall that are oriented along the transverse direction of the vehicle corresponds in particular to a length of the respective crossmember. The housing wall therefore has a layered stack which comprises, in the vertical direction of the vehicle, a first layer in the form of the wall and a second layer located thereabove in the form of the frame structure. A height of the housing wall in the vertical direction of the vehicle is therefore composed of a height of the wall and of a height of the support. By means of the multi-layered housing wall, a height of the accumulator housing can be increased and therefore a height-optimized accumulator housing provided.

In particular, a flange-like collar which is adjacent to the wall is formed, and the collar is arranged lying against end sides of the supports of the frame structure. The flange-like collar protruding laterally from the wall encircles the wall, in particular completely. The collar can be formed, for example, by bending over an outer region of the wall. The flange-like, frame-shaped collar has a stepless flat surface here. In other words, the collar has a substantially constant height profile. The end sides of the longitudinal members and of the crossmembers, which end sides face the housing part or are oriented downward, are arranged substantially at the same height, and therefore the end sides likewise form a stepless and flat surface. The frame structure formed by the support, and the frame-shaped collar can be formed, for example, congruently in order, for example, to be joined together in a precisely fitting manner. The collar can be arranged lying, for example, over the full surface area, against the end sides of the supports. A stepless sealing plane can thus be formed between the frame structure and the collar. By means of the stepless sealing plane, the accumulator housing can be particularly reliably sealed or closed off in relation to the ambient region of the motor vehicle.

It has proven advantageous if a sealing element for sealing the accumulator housing in relation to an ambient region of the motor vehicle is arranged between the edge of the housing part and the frame structure of the support structure. The sealing element can be arranged, for example, in the stepless sealing plane between the end sides of the supports and the collar of the housing part. The housing wall of the accumulator housing is therefore formed in particular by the edge with the wall and the collar, by the sealing element and by the support. The sealing element can be, for example, a sealing ring, a sealing foam, a sealing paste or the like. The components within the accumulator housing, for example the accumulator cells, control elements, a sensor arrangement for monitoring the accumulator cells, etc., can therefore be particularly reliably protected against environment influences of the ambient region, for example against moisture.

In a development of the invention, at least one plug holder for holding at least one plug-in connector for the high-voltage accumulator is formed on an outer side of the edge, the outer side facing an ambient region of the motor vehicle. In particular, the baseplate, the edge and the plug holder are formed integrally. The at least one plug holder can be designed, for example, as a tab in the collar of the housing part, for example on a transverse side of the collar. The tab and the collar are situated here at a common height level, and therefore the collar which is provided with the tab forms a flat, stepless surface. In order to reliably seal the accumulator housing, it can be provided that a further tab corresponding to the tab of the collar is formed in the frame structure of the support structure, and therefore the end sides of the supports and the collar of the housing part are, for example, congruent and, in the connected state, can form the stepless sealing plane.

The plug-in connector can be a standard plug which serves, for example, for the high-voltage accumulator to make contact with a cooling system and/or for transmitting signals between components within and outside the accumulator housing. Owing to the fact that the plug holder is located on the outer side of housing part, the plug-in connector held by the plug holder is accessible from the outside. The components in the housing interior of the accumulator housing are preconnected in particular before the housing part is arranged on the supporting structure—and therefore before the housing interior is closed. After the housing part is arranged on the support structure—and therefore after the housing interior is closed—these components can be brought into contact with components outside the housing interior via the plug-in connector, which is accessible from the outside, without the accumulator housing having to be opened.

In an advantageous development of the invention, a number of accumulator modules for the high-voltage accumulator and/or a height of the accumulator modules are/is provided depending on a height profile of the floor part, by means of which the housing interior is formed with a first height in a first region and with a second height, which is greater than the first height, in at least one second region, wherein, in the first region, a first number of accumulator modules is arranged one above another and/or the accumulator modules are formed with a first height, and, in the at least one second region, a second number of accumulator modules, which is greater than the first number, is arranged one above another and/or the accumulator modules are formed with a second height which is greater than the first height. The support structure can have a form individual to a vehicle. For example, owing to the configuration of the passenger compartment, the floor part of the support structure can have structures, by means of which the height profile of the floor part, and therefore a height of the housing interior of the accumulator housing, can vary spatially. Such structures of the floor part can be, for example, depressions in the region of a driver's seat and front passenger's seat and/or a tunnel extending along the longitudinal direction of the vehicle. By means of the different, structureless and structured floor part regions, regions in the housing interior are formed with different heights or z dimensions. The accumulator housing or the housing interior of the accumulator housing therefore has a height which is dependent on the height profile of the floor part. The first region with the first height can be situated, for example, below the driver's and front passenger's seat. The at least one second region with the second height can be situated, for example, below the tunnel in the passenger compartment. It may be the case here that, in the first region, the accumulator modules may have only the first height, and/or it may be possible for only one accumulator module or for no accumulator module to be arranged in the vertical direction of the vehicle. It is therefore possible, for example, for only one or no accumulator module plane to be fitted with accumulator modules. In the second region, the accumulator modules can have the second height and/or at least two accumulator modules can be arranged one above the other in the vertical direction of the vehicle. At least two accumulator module planes can therefore be fitted with accumulator modules.

Owing to the fact that the housing cover of the accumulator housing is formed by the floor part, the vehicle-individual heights or z dimensions can be completely used as regions of the housing interior and can be filled, for example, with the maximum number of accumulator modules. This makes it possible to increase a motor vehicle range which is dependent on the number of accumulator modules. According to the prior art which uses accumulator housings with separate housing covers, the shape of the accumulator housing either has to be adapted with a high outlay on design individually to the different z dimensions, or an available construction space would not be optimally used. However, in the present case, it is advantageously not necessary to reconfigure the accumulator housing in order to adapt it to the respective motor vehicle. On the contrary, for example, the housing parts can be manufactured as standard components in high piece numbers, can be fitted with a vehicle-individual number of accumulator modules and can be arranged on the supporting structure. The accumulator housing is therefore a modular system which can be provided with little outlay for different types of motor vehicle.

In a development of the invention, the support structure and the housing part fastened to the support structure are coated with corrosion protection. The corrosion protection can be arranged on the support structure, for example, by means of cathodic dip coating. After the housing part is arranged on the support structure, the entire body can pass through the cathodic dip coating. In an advantageous manner, the accumulator housing therefore does not have to be coated with the corrosion protection in a separate step.

According to an embodiment of the invention, at least one strut is fastened, in particular by means of a form-fitting connection, to the baseplate of the housing part, the at least one accumulator module is arranged, in particular fastened, on the at least one strut, and the edge of the housing part supporting the at least one accumulator module is fastened with fastening elements to the frame structure. The at least one strut can be designed, for example, as a transverse strut and/or a longitudinal strut. The at least one strut is fastened to the baseplate of the housing part, for example, by welding. A plurality of struts which are oriented in the transverse direction of the vehicle can be fastened to the upper side of the baseplate. The accumulator modules of a first accumulator module plane can be fastened to the respective struts, for example by means of screws. In addition, holding elements can be fastened to the struts and/or to the baseplate, the holding elements being able to hold accumulator modules of the second accumulator module plane, which is situated above the first accumulator module plane in the vertical direction of the vehicle. The housing part can therefore be preconfigured by the accumulator modules being fastened to the housing part and being, for example, appropriately wired there. The housing part which supports the accumulator modules can be arranged on the support structure.

The housing part is fastened in the region of the edge to the frame structure by means of the fastening elements. The fastening elements can be designed as screws. The high-voltage accumulator can therefore be integrated into the support structure of the motor vehicle particularly simply in few mounting steps. For example, the collar of the housing part, which collar is arranged on the end sides of the longitudinal members and front and rear crossmembers, can be connected to the supports at least in regions, in particular in a completely encircling manner. This is particularly advantageous since the fastening elements are situated only on the collar, on which the sealing element is preferably arranged. The accumulator housing formed in such a manner therefore has a high degree of tightness. In order to stabilize the accumulator housing, the housing part can be fastened to the support structure by means of at least one further fastening element, in particular in the region of the baseplate. For example, the fastening element can be arranged in the region of a center point or a center of gravity of the baseplate and can additionally connect the housing part to a further crossmember of the support structure.

It can be provided that the at least one strut is arranged below a crossmember of the support structure and lying against the crossmember, thus forming at least one intermediate wall in a housing interior of the accumulator housing. The crossmember is different in particular from the front and rear crossmembers and serves, for example, for further stabilizing the support structure. In particular, the at least one accumulator module is fastened to the at least one strut by means of screws and at least one receiving region for receiving screw heads of the screws when the at least one strut is arranged on the at least one crossmember is formed in the crossmember. When the accumulator modules are screwed to the struts, the screw heads protrude in particular beyond the struts. The protruding screw heads can be arranged in the receiving regions of the crossmembers. As a result, the housing part together with the struts and the accumulator modules fastened thereto can be arranged particularly close to the crossmembers and therefore the available construction space for the high-voltage accumulator can be used in the best possible manner.

According to a further embodiment of the invention, the at least one accumulator module is arranged on at least one clamping strip, and the at least one clamping strip is fastened by means of fastening elements to at least one crossmember of the support structure. The crossmember is in turn a crossmember which is different from the front and rear crossmembers. The clamping strips extend in particular in the transverse direction of the vehicle and/or longitudinal direction of the vehicle. Holding elements for holding accumulator modules of further accumulator module planes can in turn be arranged on the clamping strips. Particularly high stability and strength can be achieved from the connection of the accumulator modules to the support structure of the motor vehicle via the clamping strips since the accumulator modules are held by the body which is in any case rigid and fixed. The housing part is relieved of load in this case and can be produced, for example, from a particularly lightweight material.

It can be provided here that the at least one clamping strip is arranged on a mounting device, the at least one clamping strip which is connected to the at least one accumulator module is arranged on the at least one crossmember by means of the mounting device and is fastened by means of the fastening elements, and, after removal of the mounting device, the housing part is fastened to the support structure. The mounting device can be, for example, a mounting frame or a mounting plate on which the clamping strips can be arranged before or after connection to the accumulator module. The mounting device has in particular adjustment elements, for example pins, by means of which the clamping strips can be aligned and placed at defined positions with respect to one another. The mounting device can be raised, for example, in the direction of the support structure such that the clamping strips can be fastened together with the accumulator modules to the crossmembers. For example, the fastening elements designed as screws can be screwed from below through the clamping strips into the crossmembers. After the mounting device is removed, the housing part can then be fastened to the support structure in order to seal the accumulator housing.

Since the clamping strips have already been fastened to the body substructure by means of the mounting plate, the housing part can be fastened to the frame structure by means of particularly few fastening elements. For example, the housing part can have embossings running in the longitudinal direction of the vehicle and can be screwed to the crossmembers in the region of the embossings. By means of the embossings, a recess for the countersunk arrangement of the screw heads of the screws can be formed on the lower side of the floor plate. By countersinking the screws, a substantially flat lower side of the housing part without protruding screw heads can be realized.

According to a further embodiment of the invention, the at least one clamping strip is preassembled on the housing part, the at least one accumulator module is fastened to the clamping strip, and the housing part is arranged on the support structure. In particular, with the fastening elements for fastening the at least one clamping strip to the at least one crossmember, the housing part is also fastened to the at least one crossmember. For the preassembly, the clamping strips can be fixed, for example securely clamped, on the housing part. The accumulator modules can then be fastened to the clamping strips. The housing part can be lifted onto the support structure, and therefore the clamping strips can be arranged on the corresponding crossmembers. The clamping strips are fastened here to the crossmembers of the support structure with the fastening elements. The fastening elements can be, for example, fastening clips. In particular, the fastening elements are screws by means of which the housing part can additionally be connected to the at least one clamping strip and therefore to the support structure. For example, the screws can be guided from the lower side of the baseplate, the lower side facing the ambient region, through the clamping strips to the crossmember. The screws therefore simultaneously fulfill a plurality of functions, namely, firstly, of connecting the accumulator modules to the support structure and, secondly, of connecting the housing part to the support structure. According to this production variant, the high-voltage accumulator can be integrated into the support structure of the motor vehicle in few mounting steps.

A motor vehicle according to the invention has a support structure and a high-voltage accumulator, wherein the high-voltage accumulator is integrated into the support structure by means of a method according to the invention or an embodiment thereof. The motor vehicle is designed in particular as an electrically drivable motor vehicle, for example as an electric vehicle or a hybrid vehicle. The motor vehicle has in particular a self-supporting body, wherein the support structure is formed by a body substructure or body floor.

The embodiments presented with respect to the method according to the invention and the advantages of the embodiments apply correspondingly to the motor vehicle according to the invention.

Further features of the invention emerge from the claims, the figures and the description of the figures. The features and combinations of features mentioned above in the description and the features and combinations of features mentioned below in the description of the figures and/or shown solely in the figures can be used not only in the respectively stated combination, but also in different combinations or on their own.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures, identical and functionally identical elements are provided with the same reference signs.

DETAILED DESCRIPTION OF THE DRAWINGS

Figure 1:
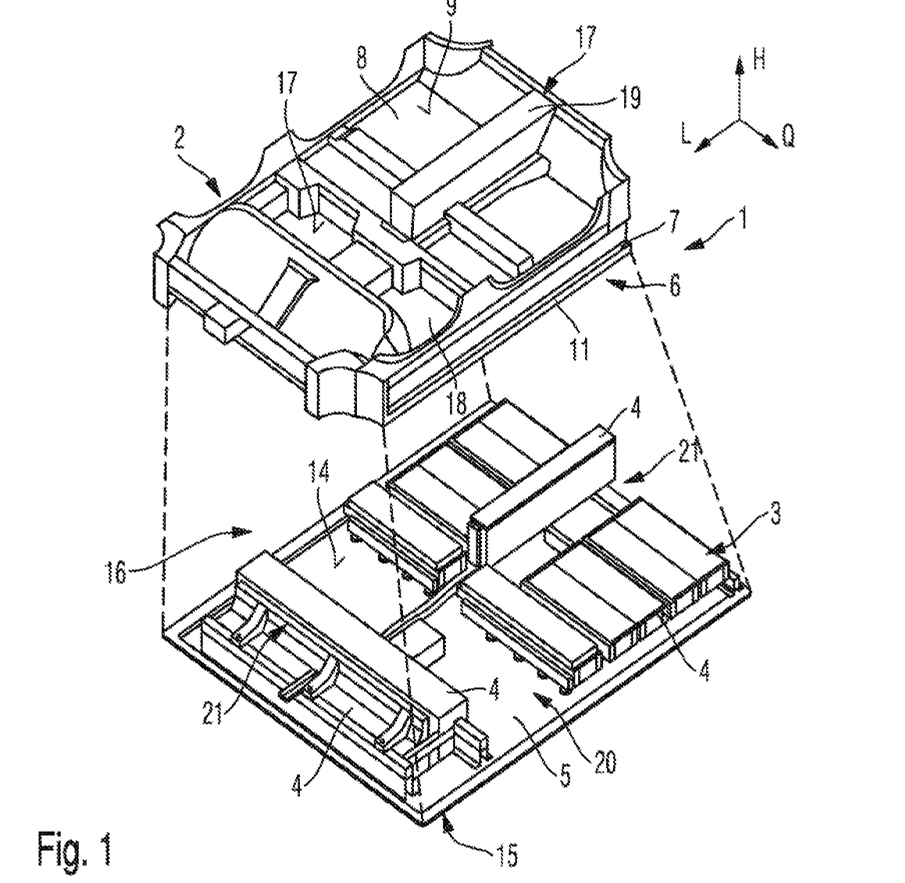
FIG. 1 shows an exploded illustration of a support structure of a motor vehicle and a high-voltage accumulator.
Figure 2:
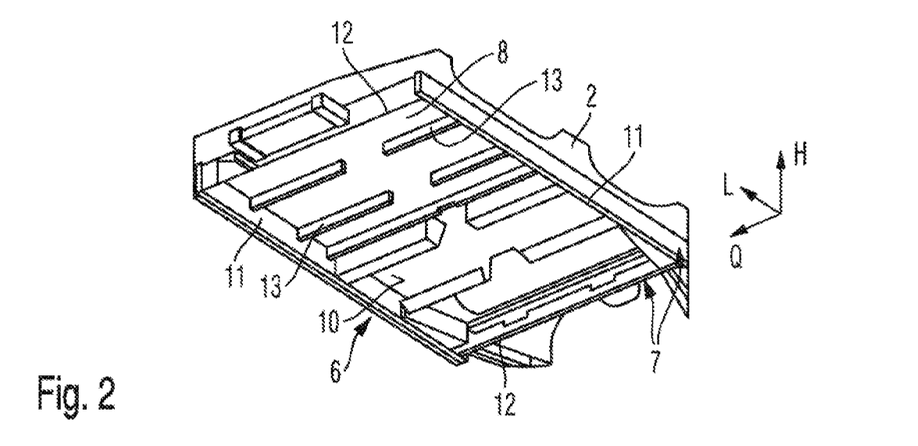
FIG. 2 shows a perspective illustration of the support structure according to FIG. 1.

FIG. 1 shows an arrangement 1 for an electrically drivable motor vehicle (not shown here). The arrangement 1 has a body 2, only partially illustrated here, of the motor vehicle, the body being illustrated from a first perspective in FIG. 1 (looking from above into the body 2) and from a second perspective in FIG. 2 (looking from below at the body 2). In addition, the arrangement 1 has a high-voltage accumulator 3 which here comprises a multiplicity of interconnected accumulator modules 4. The accumulator modules 4 are arranged here on a housing part 5. The body 2 has a support structure 6 in the form of a body substructure or body floor with a frame structure 7 and with a floor part 8. The support structure 6 serves for stabilizing the body 2 and for absorbing collision forces in the event of a collision of the motor vehicle. FIG. 1 illustrates an upper side 9 of the floor part 8 and FIG. 2 illustrates a lower side 10 of the floor part 8. The upper side 9 here faces a passenger compartment for the motor vehicle, the lower side 10 faces an ambient region of the motor vehicle, in particular a roadway for the motor vehicle.

The frame structure 7 of the support structure 6 is formed here by two longitudinal members 11 or sills running in the longitudinal direction L of the vehicle and two main crossmembers 12 which extend in the transverse direction Q of the vehicle and are in the form of a front crossmember and a rear crossmember. In addition, the support structure 6 has further secondary crossmembers 13 which are designed to further stabilize the support structure 6. The frame structure 7 is situated here in particular between a front axle and a rear axle of the motor vehicle. The housing part 5 is connected to the support structure 6 such that a housing interior is formed between the support structure 6 and the housing part 5, in particular between the lower side 10 of the floor part 8 and an upper side 14 of the housing part 5. A lower side 15 of the housing part 5 faces the ambient region of the motor vehicle. The housing part 5 can form, for example, an underbody cladding of the motor vehicle. The accumulator modules 4 of the high-voltage accumulator 3 are arranged in the housing interior which is closed in relation to the ambient region. The support structure 6 and the housing part 5 therefore form an accumulator housing 16 for the high-voltage accumulator 3. The floor part 8 forms a housing cover of the accumulator housing 16. The high-voltage accumulator 3 is therefore partially integrated into the body 2 of the motor vehicle.

A height of the housing interior of the accumulator housing 16 is dependent here on a form of the floor part 8, the form in turn being dependent on a configuration of the passenger compartment. The floor part 8 here has structures 17, by means of which a height of the floor part 8 has a positionally dependent profile. The structures 17 can be, for example, a depression 18 in the region of the passenger seat and the front passenger's seat or a tunnel 19 in the passenger compartment. The housing interior in the region of the depression 18 is of such a low height that, in a first accumulator module plane 20, no accumulator modules 4 can be arranged on the upper side 14 of the housing part 5. By contrast, the housing interior below the tunnel 19 is of a sufficient height such that the first accumulator module plane 20 and a second accumulator module plane 21, which is located thereabove in the vertical direction H of the vehicle, can be equipped with accumulator modules 4. A plurality of accumulator modules 4 can be arranged or stacked one above another in the vertical direction H of the vehicle below the tunnel 19.

Figure 3:
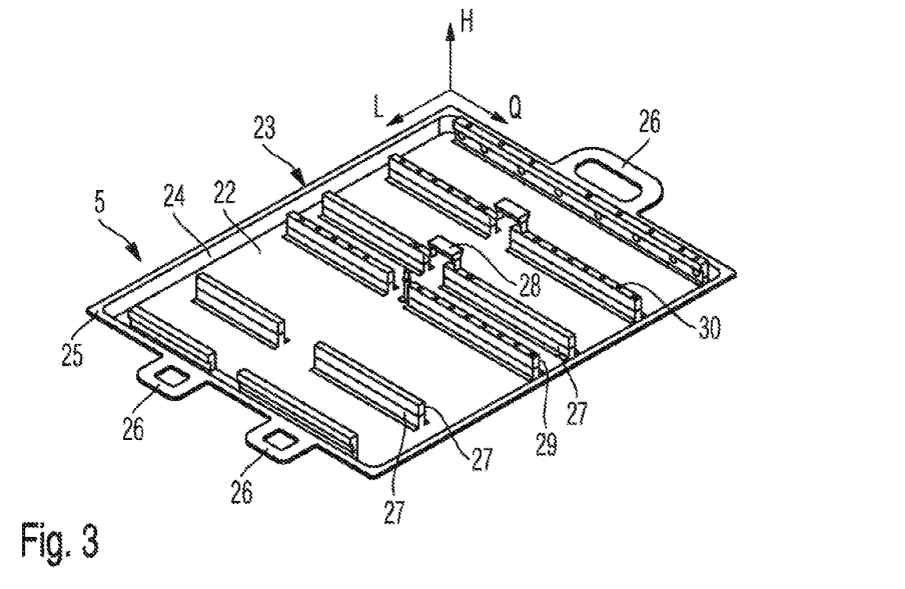
FIG. 3 shows a schematic illustration of a housing part with struts for holding accumulator modules.
Figure 4:
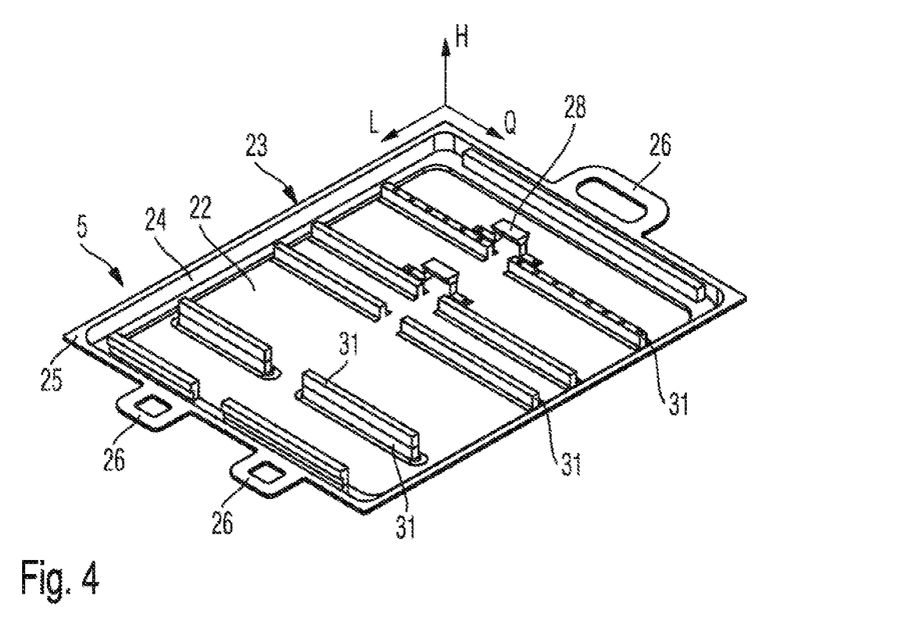
FIG. 4 shows a schematic illustration of a housing part with clamping strips for holding accumulator modules.

The housing part 5 is shown unequipped in FIG. 3 and FIG. 4. The housing part 5 is formed integrally and can be manufactured, for example, from sheet metal. The housing part 5 has a baseplate 22 which forms a housing base of the accumulator housing 16. In addition, the housing part 5 has an edge 23 encircling the baseplate 22. The edge 23 is formed here by a wall 24 which is raised in relation to the baseplate 22 and by a flange-like collar 25 protruding laterally from the wall 24. The collar 25 has a flat, stepless surface, by means of which a sealing surface for sealing the accumulator housing 16 is formed. Those regions of the collar 25 which run in the longitudinal direction L of the vehicle can be arranged on end sides 37 (see FIG. 9 and FIG. 10) of the longitudinal members 11 of the frame structure 7, and those regions of the collar 25 which run in the transverse direction Q of the vehicle can be arranged on end sides 37 of the main crossmembers 12 of the frame structure 7. The end sides 37 of the supports 11, 12 likewise form a sealing surface, and therefore a connecting region between the collar 25 and the end sides 37 of the supports 11, 12 forms a sealing plane. In addition, a sealing element, not shown here, for example a sealing ring, can be arranged between the collar 25 and the end sides 37. In addition, the housing part 5 has a plug holder 26 for holding plug-in connectors 35 (see FIG. 5 to FIG. 8) of the high-voltage accumulator 3, the plug-in connectors being designed here as tabs in the collar 25. The collar 25 and the tab-shaped plug holders 26 likewise form a stepless, flat surface. The plug holders 26 are therefore arranged in the region of the sealing plane.

Figure 5:
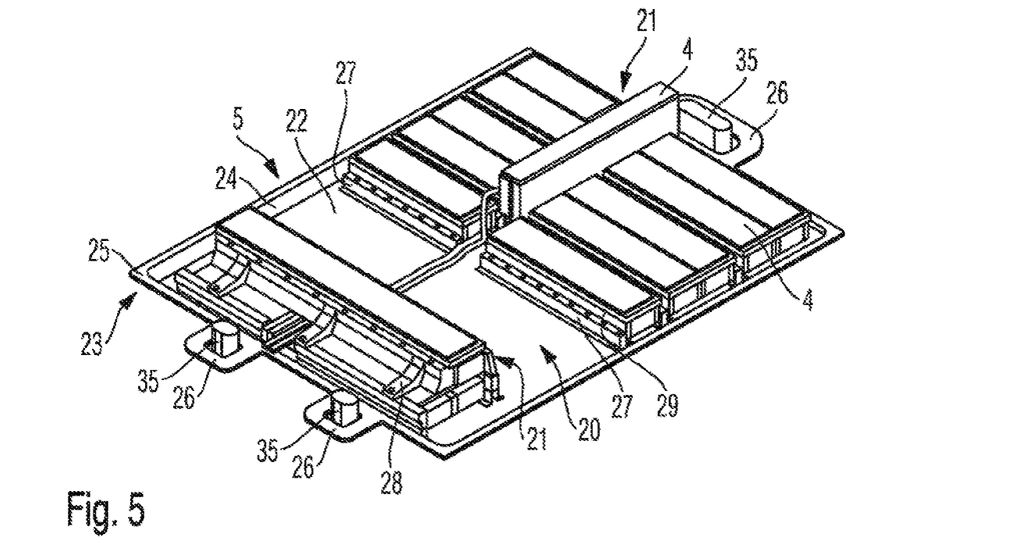
FIG. 5 shows a schematic illustration of the housing part with the struts according to FIG. 3, which housing part is equipped with accumulator modules of a high-voltage accumulator.
Figure 7:
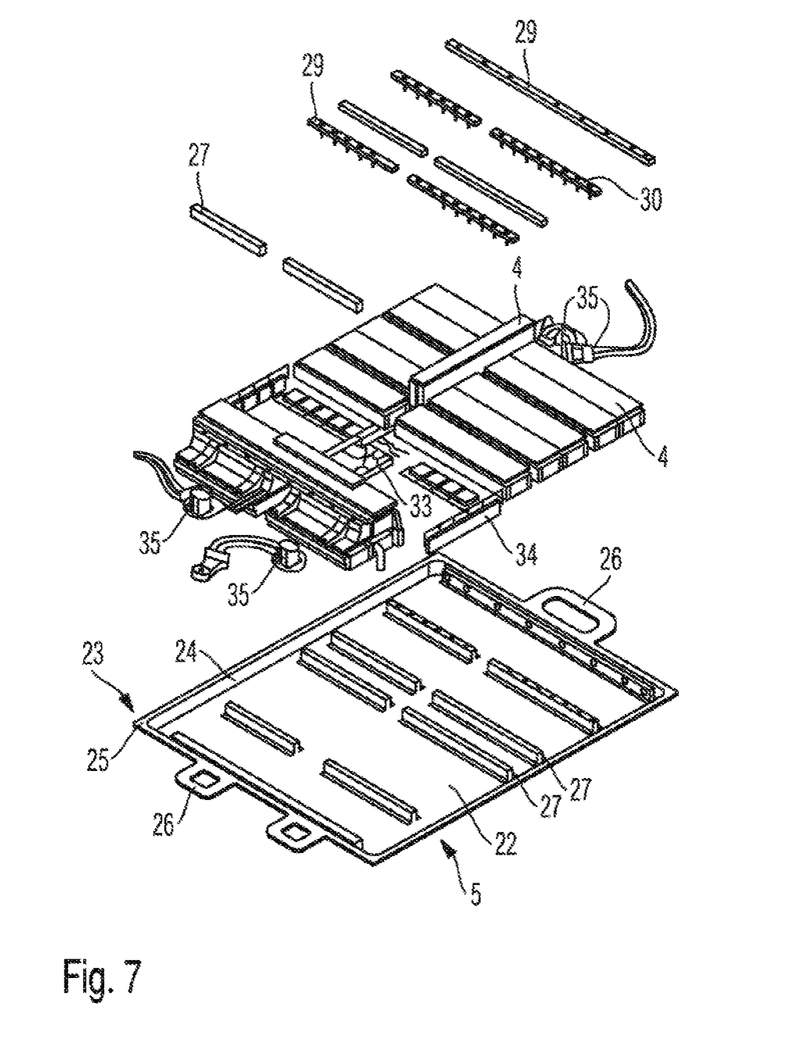
FIG. 7 shows an exploded illustration of the equipped housing part according to FIG. 5.

According to FIG. 3, a multiplicity of struts 27 which are oriented here in the transverse direction Q and to which the accumulator modules 4 can be fastened are arranged on the baseplate 22. The struts 27 are connected here in an integrally bonded manner to the baseplate 22. For example, the struts 27 are welded onto the baseplate 22. In addition, holding elements 28 are fastened, for example screwed, here to the struts 27. The holding elements 28 serve to hold accumulator modules 4 in the further accumulator module plane 21. The accumulator modules 4 can be fastened to the struts 27 by means of fixing strips 29 which are shown here placed onto the struts 27. FIG. 5 shows the accumulator modules 4 fixed to the struts 27 according to FIG. 3. An exploded illustration of the arrangement according to FIG. 5 is shown in FIG. 7. The fixing strips 29 and therefore the accumulator modules 4 can be fastened to the corresponding struts 27, for example, by means of screws 30.

Figure 6:
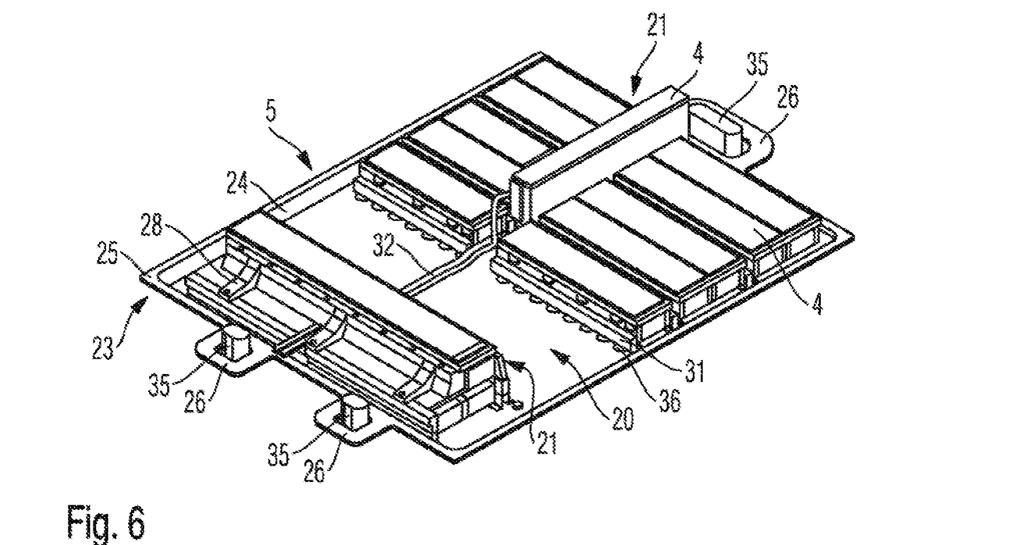
FIG. 6 shows a schematic illustration of the housing part with the clamping strips according to FIG. 4, which housing part is equipped with accumulator modules of a high-voltage accumulator.
Figure 8:
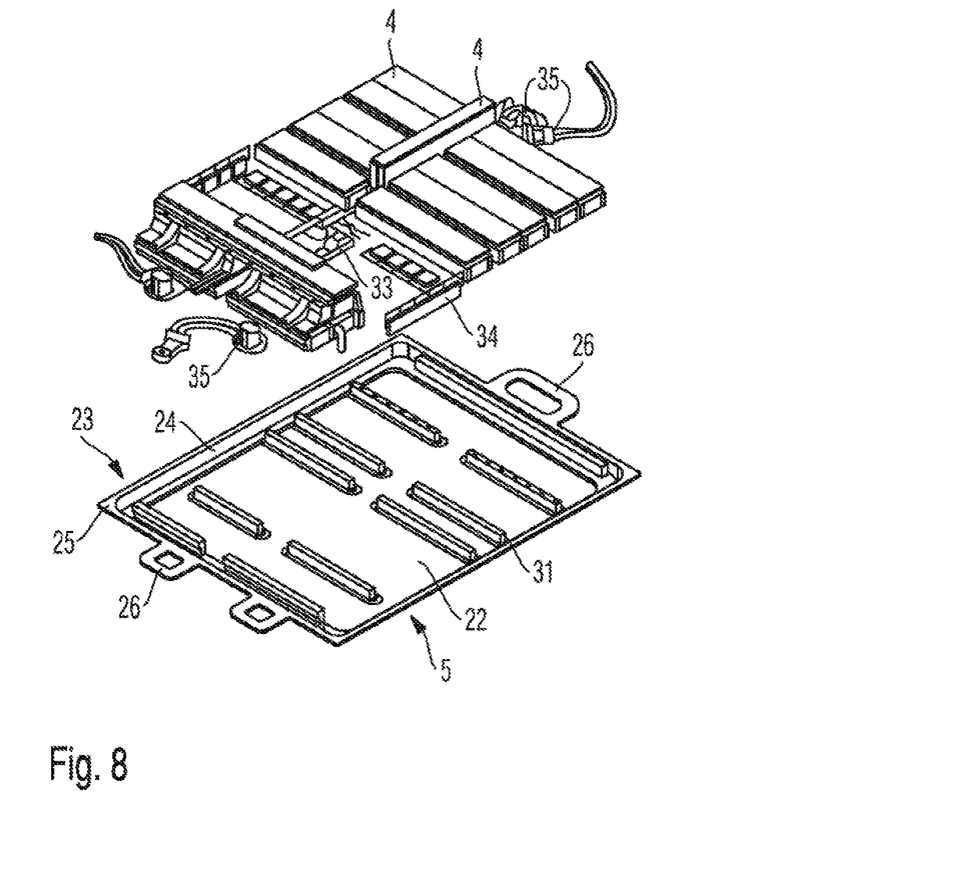
FIG. 8 shows an exploded illustration of the equipped housing part according to FIG. 6.

In FIG. 4, a multiplicity of clamping strips 31 which are oriented here in the transverse direction Q are arranged on the baseplate 22. FIG. 6 shows the accumulator modules 4 fastened to the clamping strips 31. An exploded illustration of the arrangement according to FIG. 6 is shown in FIG. 8. The clamping strips 31 are merely placed here onto the housing part 5 or are securely clamped to the housing part 5. In order to fix the clamping strips 31, for example brushes 36 (see FIG. 6) can be arranged in the housing part 5. The holding elements 28 for the further accumulator module plane 21 are arranged here on the baseplate 22.

In addition, it is shown in FIG. 5 to FIG. 8 that all of the components of the high-voltage accumulator 3, for example the accumulator modules 4, control elements 33 for activating the accumulator modules 4, elements 34 for monitoring the compartment, etc., are already interconnected via lines 32. The lines 32 can be guided to the plug-in connectors 35 which can be held by the plug holder 26. After the housing part 5 is arranged on the supporting structure 6 and therefore after the accumulator modules 4 are arranged in the housing interior, the plug holder 26 and therefore the plug-in connectors 35 are accessible from the outside.

Figure 9:
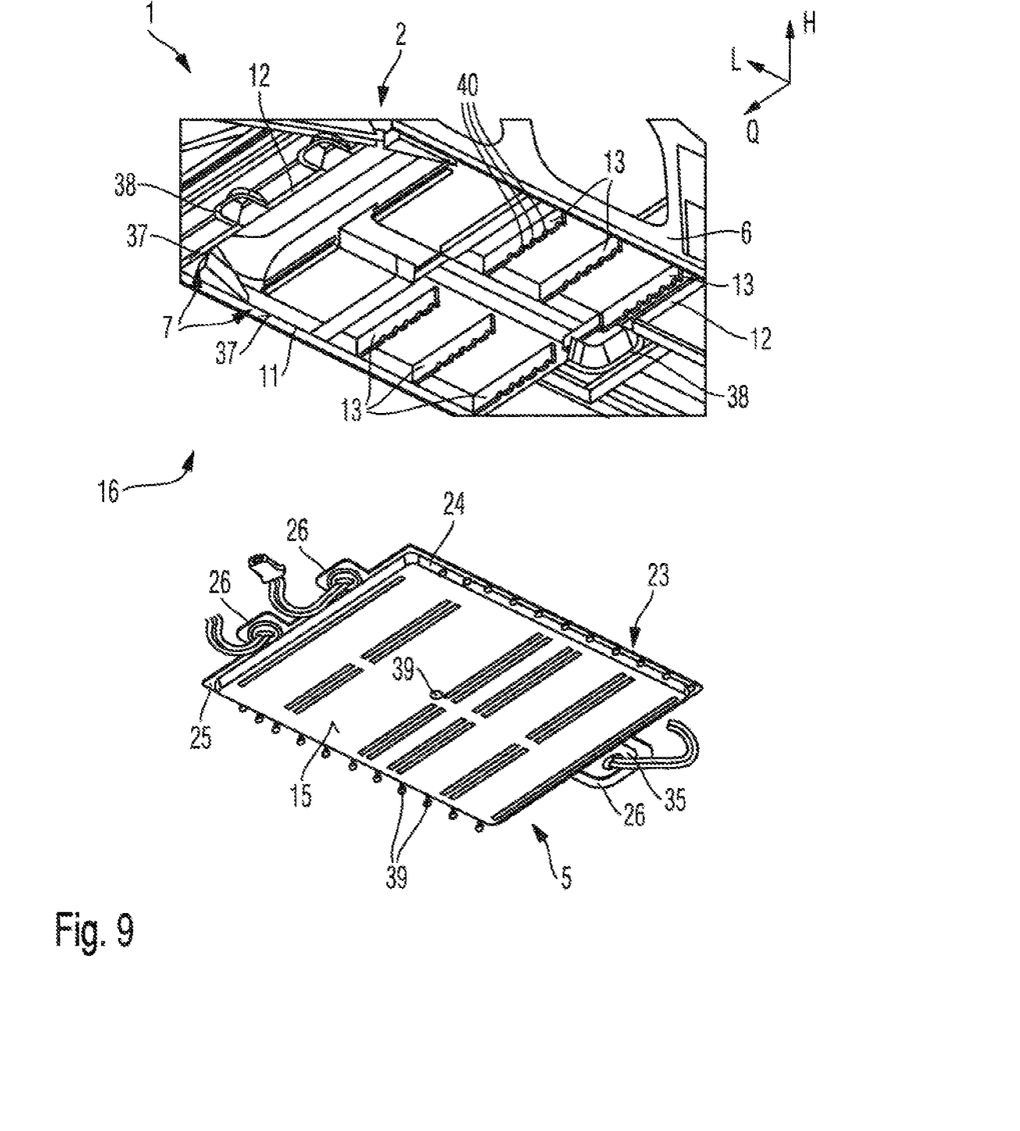
FIG. 9 shows an exploded illustration of the support structure and the equipped housing part according to FIG. 5.
Figure 10:
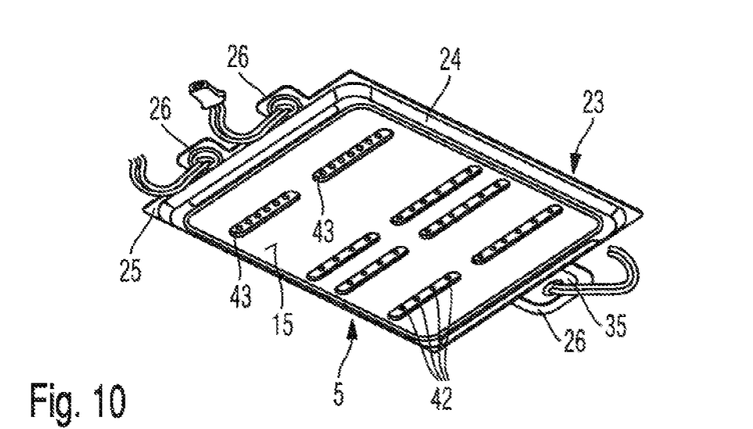
FIG. 10 shows an exploded illustration of the support structure and the equipped housing part according to FIG. 6.

FIG. 9 shows an exploded illustration of a first embodiment of the arrangement 1 with the body 2 and the housing part 5 having the struts 27 according to FIG. 3, FIG. 5 and FIG. 7. FIG. 10 shows an exploded illustration of a second embodiment of the arrangement 1 with the body 2 and the housing part 5 having the clamping strips 31 according to FIG. 4, FIG. 6 and FIG. 8. In order to produce the arrangement 1, the edge 23 of the housing base 5 is arranged on the end sides 37 of the supports 11, 12. The crossmembers 12 here have tabs 38 corresponding to the tab-shaped plug holders 26, and therefore the frame structure 7 and the frame-shaped collar 25 are substantially congruent with the plug holder 26. The collar 25 with the plug holder 26 can therefore be arranged in a precisely fitting manner on the end sides 37 of the supports 11, 12. After the housing part 5 is arranged on the supporting structure 6, a side wall of the accumulator housing 16 that surrounds the housing interior is formed by the wall 24 of the housing part 5 and by the supports 11, 12.

Figure 11:
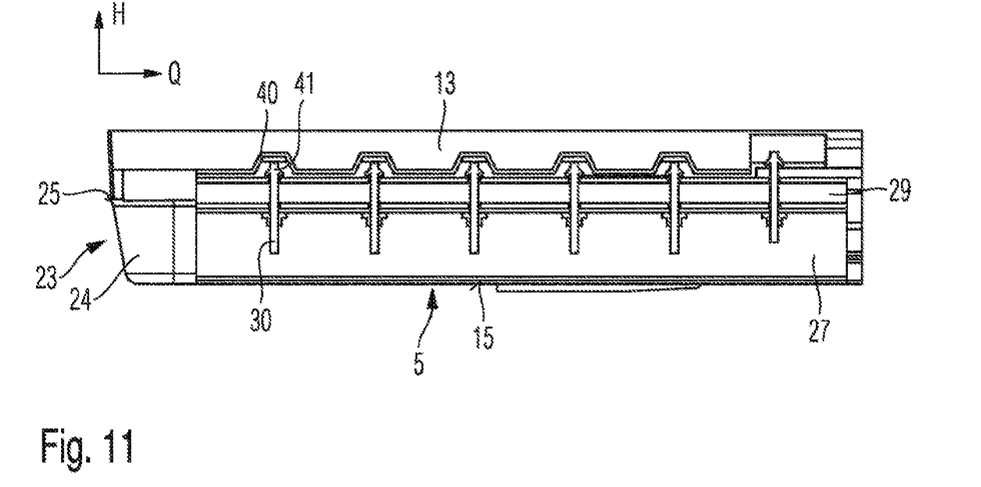
FIG. 11 shows a cross-sectional illustration of the support structure and of the equipped housing part according to FIG. 9.

In order to produce the first embodiment of the arrangement 1 according to FIG. 9, the housing part 5 supporting the accumulator modules 4 is fastened to the frame structure 7 at the edge 23, here at regions of the collar 25 extending in the longitudinal direction L, with fastening elements 39, for example screws. In order to stabilize the accumulator housing 16, a further fastening element 39 can also be arranged at a center of gravity of the baseplate 22 and can be fixedly connected to a secondary crossmember 13 of the supporting structure 6. The struts 27 which are not visible here and are located on the upper side 14 of the housing part 5 are arranged on the secondary crossmembers 13 with intermediate walls being formed in the housing interior of the accumulator housing 16. The secondary crossmembers 13 can have receiving regions 40 in which screw heads 41 (see FIG. 11) of the screws 30 for fastening the accumulator modules 4 to the struts 27 can be arranged. A cross section of part of the joined-together arrangement 1 according to FIG. 9, in which the screw heads 41 are arranged in the receiving regions 40, is shown in FIG. 11.

Figure 12:
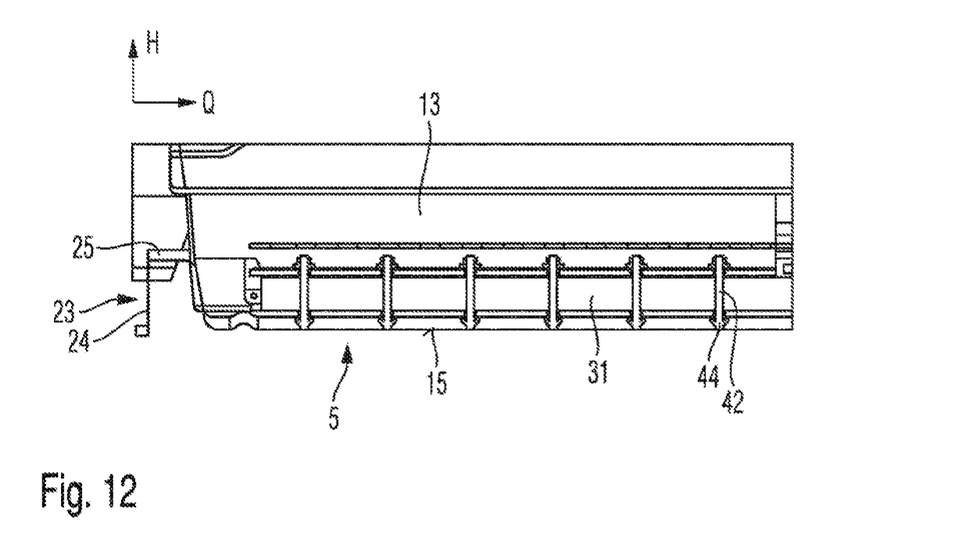
FIG. 12 shows a cross-sectional illustration of the support structure and of the equipped housing part according to FIG. 10.

In order to produce the second embodiment of the arrangement 1 according to FIG. 10, the clamping strips 31, not visible here, are fastened to the supporting structure 6, for example to the secondary crossmembers 13, such that the accumulator modules 4 can be held by the supporting structure 6. The clamping strips 31 can be fixedly connected to the secondary crossmembers 13, for example by means of fastening elements 42. For this purpose, the fastening elements 42 can be screwed, as shown in FIG. 10, from the lower side 15 of the baseplate 22 through the clamping strips 31 onto the secondary crossmembers 13. The fastening elements 42 which are designed in particular as screws therefore also fasten the housing part 5 to the supporting structure 6, wherein the housing part 5 here does not, for example, carry out any supporting function. FIG. 12 illustrates a cross section of part of the joined-together arrangement 1 according to FIG. 10. Screw heads 44 of the fastening elements 42 designed as screws are arranged here on the lower side 15 of the housing part 5. For the countersunk arrangement of the screws, recesses 43 can be formed in the housing part 5. In order to form the recesses 43, embossings can be provided in the lower side 15 of the baseplate 22 of the housing part 5, in which embossings the screw heads 44 are arranged.

It can also be provided that the clamping strips 31 are fastened with the accumulator modules 4 to the crossmembers 13 in a first mounting step. For this purpose, the clamping strips 31 can be arranged with the accumulator modules 4 on a mounting device which is removed again after the clamping strips 31 are connected to the crossmembers 13. In a second mounting step, the housing part 5 can then be fastened with just a few fastening elements to the supporting structure 6. As soon as the housing part 5 is fastened to the supporting structure 6 and the high-voltage accumulator 3 has thereby been integrated in the supporting structure 6, the arrangement 1 can be coated with corrosion protection, for example by means of cathodic dip coating.

LIST OF REFERENCE SIGNS

1 Arrangement
2 Body
3 High-voltage accumulator
4 Accumulator modules
5 Housing part
6 Supporting structure
7 Frame structure
8 Floor part
9 Upper side of the floor part
10 Lower side of the floor part
11 Longitudinal member
12 Crossmember
13 Crossmember
14 Upper side of the housing part
15 Lower side of the housing part
16 Accumulator housing
17 Structure
18 Depression
19 Tunnel
20 First accumulator module plane
21 Second accumulator module plane
22 Baseplate
23 Edge
24 Wall
25 Collar
26 Plug holder
27 Strut
28 Holding element
29 Fixing strip
30 Screws
31 Clamping strip 32 Line
33 Control element
34 Elements for monitoring the compartment
35 Plug-in connector
36 Bushing
37 End sides
38 Tab
39 Fastening elements
40 Receiving region
41 Screw heads
42 Fastening elements
43 Recess
44 Screw heads
L Longitudinal direction of the vehicle
Q Transverse direction of the vehicle
H Vertical direction of the vehicle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for integrating a high-voltage accumulator having at least one accumulator module into a support structure of a motor vehicle, the method comprising:
   providing a housing part having a baseplate and a frame-shaped edge surrounding the baseplate;
   arranging the at least one accumulator module on at least one of the housing part or the support structure;
   arranging the edge of the housing part below and on a frame structure formed from supports of the support structure; and
   fastening the housing part to the support structure, with an accumulator housing for the at least one accumulator module being formed, wherein a housing interior of the accumulator housing is bounded by a floor part of the support structure, which floor part covers the frame structure in a direction of a passenger compartment of the motor vehicle, and by the housing part and the frame structure, wherein
   the edge of the housing part is formed by a wall which is raised in relation to the baseplate,
   a housing cover of the accumulator housing is formed by the floor part,
   a housing base of the accumulator housing is formed by the baseplate, and
   a housing wall of the accumulator housing is formed by the wall and by the frame structure which is situated above the wall in a vertical direction of the vehicle.

2. The method according to claim 1, wherein
   a flange-shaped collar, which is adjacent to the wall, is formed, and
   the collar is arranged lying against end sides of the supports of the frame structure.

3. The method according to claim 1, wherein
   a sealing element for sealing the housing interior of the accumulator housing in relation to an ambient region of the motor vehicle is arranged between the edge of the housing part and the frame structure of the support structure.

4. The method according to claim 1, wherein
   at least one plug holder for holding at least one plug-in connector for the high-voltage accumulator is formed on an outer side of the edge, the outer side facing an ambient region of the motor vehicle.

5. The method according to claim 1, wherein
   a number of accumulator modules for the high-voltage accumulator and/or a height of the accumulator modules are provided depending on a height profile of the floor part, by which the housing interior is formed with a first height in a first region and with a second height, which is greater than the first height, in at least one second region,
   in the first region, a first number of accumulator modules is arranged one above another and/or the accumulator modules are formed with a first height, and
   in the at least one second region, a second number of accumulator modules, which is greater than the first number, is arranged one above another and/or the accumulator modules are formed with a second height which is greater than the first height.

6. The method according to claim 1, wherein
   the support structure and the housing part fastened to the support structure are coated with corrosion protection.

7. The method according to claim 1, wherein
   at least one strut is fastened to the baseplate of the housing part,
   the at least one accumulator module is arranged on the at least one strut, and
   the edge of the housing part supporting the at least one accumulator module is fastened with fastening elements to the frame structure.

8. The method according to claim 7, wherein
   the at least one strut is arranged below a crossmember of the support structure and lying against the crossmember, thus forming at least one intermediate wall in the housing interior of the accumulator housing.

9. The method according to claim 1, wherein
   the at least one accumulator module is arranged on at least one clamping strip, and
   the at least one clamping strip is fastened with fastening elements to at least one crossmember of the support structure.

10. The method according to claim 9, wherein
    the at least one clamping strip is arranged on a mounting device, and
    the at least one clamping strip which is connected to the at least one accumulator module is arranged on the at least one crossmember by the mounting device and is fastened with the fastening elements, and, after removal of the mounting device, the housing part is fastened to the support structure.

11. The method according to claim 9, wherein
    the at least one clamping strip is preassembled on the housing part,
    the at least one accumulator module is fastened to the clamping strip, and
    the housing part is arranged on the support structure.

12. The method according to claim 11, wherein
    with the fastening elements for fastening the at least one clamping strip to the at least one crossmember, the housing part is also fastened to the at least one crossmember.

13. A motor vehicle comprising a support structure and a high-voltage accumulator, wherein the high-voltage accumulator is integrated in the support structure by:
    providing a housing part having a baseplate and a frame-shaped edge surrounding the baseplate;
    arranging the at least one accumulator module on at least one of the housing part or the support structure;

arranging the edge of the housing part below and on a frame structure formed from supports of the support structure; and fastening the housing part to the support structure, with an accumulator housing for the at least one accumulator module being formed, wherein a housing interior of the accumulator housing is bounded by a floor part of the support structure, which floor part covers the frame structure in a direction of a passenger compartment of the motor vehicle, and by the housing part and the frame structure, wherein the edge of the housing part is formed by a wall which is raised in relation to the baseplate, a housing cover of the accumulator housing is formed by the floor part, a housing base of the accumulator housing is formed by the baseplate, and a housing wall of the accumulator housing is formed by the wall and by the frame structure which is situated above the wall in a vertical direction of the vehicle.

* * * * *